(12) United States Patent
Rau (10) Patent No.: US 10,113,407 B2
(45) Date of Patent: *Oct. 30, 2018

(54) ELECTROCHEMICAL PRODUCTION OF METAL HYDROXIDE USING METAL SILICATES

(75) Inventor: Gregory Hudson Rau, Castro Valley, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 655 days.

This patent is subject to a terminal disclaimer.

(21) Appl. No.: 13/008,238

(22) Filed: Jan. 18, 2011

(65) Prior Publication Data

US 2012/0183462 A1    Jul. 19, 2012
US 2014/0234193 A9    Aug. 21, 2014

Related U.S. Application Data

(63) Continuation-in-part of application No. 12/184,748, filed on Aug. 1, 2008, now Pat. No. 8,177,946.

(Continued)

(51) Int. Cl.
  *C25B 1/00* (2006.01)
  *E21B 43/28* (2006.01)
(Continued)

(52) U.S. Cl.
  CPC ............ *E21B 43/28* (2013.01); *B01D 53/40* (2013.01); *B01D 53/62* (2013.01); *C25B 1/00* (2013.01); *C25B 1/04* (2013.01); *C25B 1/16* (2013.01); *C25B 1/20* (2013.01); *C25B 1/26* (2013.01); *B01D 2251/304* (2013.01); *B01D 2251/306* (2013.01); *B01D 2251/402* (2013.01); *B01D 2251/404* (2013.01); *B01D 2251/604* (2013.01); *B01D 2252/103* (2013.01); *B01D 2255/2092* (2013.01); *B01D 2257/302* (2013.01);

(Continued)

(58) Field of Classification Search
  CPC .......... C02F 1/4618; C02F 2001/46185; C02F 2001/4619; C02F 2001/46195; C25B 1/006; C01B 33/20; C01B 33/22; C01B 33/24; C01B 33/26
  USPC .......................................... 205/508–510, 549
  See application file for complete search history.

(56) References Cited

U.S. PATENT DOCUMENTS 1,886,163 A * 11/1932 Christensen ............ C22L 33/00
                                                    159/4.02
2,028,386 A *  1/1936 Finkeldey ...................... 106/721
(Continued)

FOREIGN PATENT DOCUMENTS

GB      923807     * 4/1963 ............... C25B 3/12
JP   2001334271    * 6/2004 ............... C02F 1/68

OTHER PUBLICATIONS

Kurt et al, J. 2006. Sodium Hydroxide. Ullmann's Encyclopedia of Industrial Chemistry.*

*Primary Examiner* — Luan V Van
*Assistant Examiner* — Salil Jain
(74) *Attorney, Agent, or Firm* — Eddie E. Scott (57) ABSTRACT

Systems are described for dissolving metal silicates to: produce metal hydroxide; remove carbon dioxide or other acid gases from the atmosphere or other gas mixture by reacting such gases with the metal hydroxide; penetrate or excavate metal silicates; extract metals or silicon-containing compounds from metal silicates; and produce hydrogen and oxygen or other gases.

11 Claims, 5 Drawing Sheets

Related U.S. Application Data (60) Provisional application No. 60/964,288, filed on Aug. 9, 2007.

(51) Int. Cl.
*B01D 53/40* (2006.01)
*B01D 53/62* (2006.01)
*C25B 1/04* (2006.01)
*C25B 1/16* (2006.01)
*C25B 1/20* (2006.01)
*C25B 1/26* (2006.01)

(52) U.S. Cl.
CPC .. *B01D 2257/304* (2013.01); *B01D 2257/402* (2013.01); *B01D 2257/504* (2013.01); *Y02C 10/04* (2013.01); *Y02C 20/10* (2013.01); *Y02E 60/366* (2013.01); *Y02P 20/152* (2015.11); *Y02P 20/153* (2015.11)

(56) References Cited

U.S. PATENT DOCUMENTS

| | | | | |
|---|---|---|---|---|
| 2,321,367 A * | 6/1943 | Diggin | C25D 17/10 | 204/279 |
| 3,304,151 A * | 2/1967 | Gaiser et al. | | 423/232 |
| 3,338,667 A | 8/1967 | Pundsack | | |
| 3,345,212 A * | 10/1967 | Schweitzer | C25C 1/06 | 205/66 |
| 3,407,129 A * | 10/1968 | Petrocelli | B01J 39/04 | 205/712 |
| 3,795,595 A * | 3/1974 | Wilson | C01B 35/06 | 205/547 |
| 3,904,787 A * | 9/1975 | Trebinger | C09C 1/28 | 106/490 |
| 4,124,471 A * | 11/1978 | Lieb et al. | | 423/333 |
| 4,242,192 A * | 12/1980 | Dunning, Jr. | C25C 7/007 | 204/212 |
| 4,384,889 A * | 5/1983 | Wiewiorowski et al. | | 75/722 |
| 4,387,008 A * | 6/1983 | Winyall et al. | | 205/549 |
| 4,444,961 A * | 4/1984 | Timm | | 526/88 |
| 5,744,013 A * | 4/1998 | Botts et al. | C25D 17/12 | 204/242 |
| 6,264,740 B1 * | 7/2001 | McNulty, Jr. | C04B 12/00 | 106/638 |
| 6,767,444 B1 * | 7/2004 | Miller | C25B 1/00 | 205/43 |
| 7,132,090 B2 * | 11/2006 | Dziedzic | B01D 53/229 | 423/230 |
| 7,566,388 B2 | 7/2009 | Sasaki et al. | | |
| 8,177,946 B2 * | 5/2012 | Rau | | 204/242 |
| 2004/0007477 A1 * | 1/2004 | Bellino | C22B 23/043 | 205/580 |
| 2004/0213705 A1 | 10/2004 | Blencoe et al. | | |
| 2005/0126923 A1 * | 6/2005 | Marsden et al. | | 205/580 |
| 2005/0180910 A1 | 8/2005 | Park et al. | | |
| 2007/0045107 A1 * | 3/2007 | Pellet et al. | | 204/297.01 |
| 2007/0059577 A1 * | 3/2007 | Takeuchi et al. | | 429/33 |
| 2007/0131541 A1 * | 6/2007 | Miyashita | | 204/257 |
| 2008/0112868 A1 | 5/2008 | Blencoe et al. | | |
| 2009/0032403 A1 * | 2/2009 | Malhotra | C25C 1/22 | 205/46 |
| 2009/0038955 A1 | 2/2009 | Rau | | |
| 2009/0152117 A1 * | 6/2009 | Akahori | B01D 61/48 | 204/630 |
| 2010/0051859 A1 | 3/2010 | House et al. | | |
| 2010/0313794 A1 * | 12/2010 | Constantz et al. | | 106/706 |

* cited by examiner

ELECTROCHEMICAL PRODUCTION OF METAL HYDROXIDE USING METAL SILICATES

CROSS-REFERENCE TO RELATED APPLICATIONS

This application is a Continuation-in-Part of U.S. Non-Provisional patent application Ser. No. 12/184,748 filed Aug. 1, 2008, titled, "Electrochemical Formation of Hydroxide for Enhancing Carbon Dioxide and Acid Gas Uptake by a Solution", now U.S. Pat. No. 8,177,946 issued May 15, 2012, which claims priority based upon U.S. Provisional Patent Application No. 60/964,288 filed Aug. 9, 2007, titled, "Electrochemical Formation of Hydroxide for Enhancing Carbon Dioxide and Acid Gas Uptake by a Solution." The aforementioned applications are incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to the use of metal silicates in an electrochemical system to produce metal hydroxide. The invention also relates to: 1) reacting the preceding metal hydroxide with carbon dioxide or other acid gases as contained in the atmosphere or other gas mixture, thus effecting acid gas removal from the gas mixture, 2) separation or extraction of metals, silicon-containing compounds, or both from metal silicates, 3) the dissolution, penetration, or excavation of a metal silicate mass such as a natural metal silicate mineral stratum, and 4) the production of hydrogen, oxygen, or other gases.

State of Technology

Metal hydroxides (e.g., KOH, NaOH, $Ca(OH)_2$) have wide use in various industrial, chemical, manufacturing, agricultural, aquacultural, and environmental applications. For example, such hydroxides can be used as a chemical feedstock, used for control or neutralization of acidity, used for effecting the flocculation and precipitation of carbonates or other compounds, and used for the production of cement. However, since metal hydroxides are rare in nature they must be produced from other raw materials using energy-intensive processes. In the case of electrochemical formation of NaOH via the chlor-alkali process, it was recently shown (USPA 2009/0038955) that production of hydroxide could be increased by 5× with the addition of a metal carbonate, $CaCO_3$, to the anolyte of the electrolysis cell. This was explained by the metal carbonate reacting with the acidity ($H^+$ or $H_3O^+$) produced at the anode to form carbonic acid, $H_2CO_3$ and calcium ions, $Ca^{2+}$. The $Ca^{2+}$ subsequently migrates toward and reacts with the excess hydroxyl ion, $OH^-$, produced at the cathode to form $Ca(OH)_2$ in solution. While this hydroxide could itself have commercial value, it was also proposed that it be used to absorb $CO_2$ or other acid gases from air or a waste gas stream and convert them to metal salts. For example, by maintaining a solution pH<9, the hydroxide reaction with $CO_2$ would predominantly form dissolved bicarbonates thus allowing net $CO_2$ absorption via the reactions:

[Reaction 1]

[Reaction 2]

Net reaction:

[Reaction 3]

Note that in this example, allowing $CaCO_3$ rather than $Ca(HCO_3)_{2aq}$ to form (e.g., at pH>9) would simply regenerate the initial $CaCO_3$ and thus defeat net $CO_2$ absorption.

Powering the electrolysis with electricity derived from non-fossil sources (e.g., wind, solar, wave, geothermal, nuclear, etc.) would create a system for net $CO_2$ mitigation from air or other gas parcel or stream. Co-production of valuable by-products such as $H_2$, $O_2$, and/or $Cl_2$ could help offset the cost of the process.

Use of other alkaline minerals (in particular silicate minerals) to facilitate $CO_2$ and other acid gas capture and sequestration has been previously described. Silicate minerals are particularly attractive as sources of metals and metal ions because of the natural abundance of such minerals. However, they are often very resistant to dissolution or decomposition. Previous inventors (e.g., Blencoe et al. (USPA 2008/0112868; U.S. Pat. No. 7,666,250), Park et al. (2005/0180910), and Nelson (U.S. Pat. No. 4,058,587)) disclose methods of dissolving mineral silicates in acid or base solutions, with the metal ions derived from such dissolution ultimately forming metal salts, such as carbonates, bicarbonates, and sulfates when exposed to excess acid gases such as $CO_2$ and $SO_2$. The preceding inventors and others (e.g., Pundsack (U.S. Pat. No. 3,335,667); Lalancette (U.S. Pat. No. 4,124,683) further describe metal and silicon compound extraction from mineral silicates using various embodiments of their metal silicate dissolution processes.

House et al. (USPA 2010/0051859) describe a chlor-alkali system for generating NaOH, $H_2$, and $Cl_2$ where the NaOH produced is used to consume $CO_2$ and form $NaHCO_3$ or $Na_2CO_3$. The $H_2$ and $Cl_2$ are subsequently reacted in a separate fuel cell to produce electricity and HCl. This latter acid is then consumed and neutralized by reaction with silicate minerals to form metal chlorides. In this way mineral silicates are indirectly used to facilitate $CO_2$ removal and sequestration by providing a means of consuming and neutralizing environmentally harmful $Cl_2$ that is otherwise co-produced in the conventional chlor-alkali production of the NaOH.

The present invention seeks to streamline and make more efficient the dissolution of metal silicates and formation of metal ions, metal hydroxides, and silicon compounds by directly exposing metal silicates to the strongly acidic anolyte, the strongly basic catholyte, or both of certain electrochemical cells. When used for acid gas mitigation, this electrochemical method of metal silicate dissolution and carbonation avoids the high temperatures and/or pressures typically required to decomposed metal silicates and to subsequently form metal salts of the acid gases.

SUMMARY OF INVENTION

Features and advantages of the present invention will become apparent from the following description. Applicant is providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an electrochemical system for dissolving metal silicates, including natural silicate minerals, to form metal hydroxides. In one embodiment the invention employs such hydroxide for absorbing, neutralizing, and storing carbon dioxide or other acid gases in the form of metal salts of those acids.

The metal ions, metal hydroxide, or metal salt produced could also be processed through various chemical, electrochemical, or thermal reduction processes, thus facilitating extraction of metals from the original silicate minerals. It is also understood that various silicon compounds including silica and silicic acid can be extracted from the original metal silicate by the electrochemical system described.

In one embodiment of the present invention metal hydroxide is formed in the course of electrolyzing a water solution. This involves the steps of providing: an electrochemical cell containing an acid-producing anode and a hydroxyl-producing cathode; a water solution of sufficient ionic content to allow an electric current to pass between the hydroxyl-producing cathode and the acid-producing anode submerged in the solution; placing a mass of acid-soluble metal silicate in close proximity to the acid-producing anode; a direct current electrical voltage across the acid-producing anode and the hydroxyl-producing cathode sufficient to generate acid at the acid-producing anode and hydroxyl ions at the hydroxyl-producing cathode; acid dissolution of at least part of the metal silicate into metal and silicate ions and allowing the metal ions to travel toward the hydroxyl-producing cathode, combining with the hydroxyl ions to form the metal hydroxide, and allowing the silicate ions to travel toward the acid-producing anode to form silicic acid, silica, and/or other compounds containing silicon.

Another embodiment allows for the dissolution of base- or alkali-soluble metal silicates by using the same steps above with the exception that the metal silicate mass is placed in close proximity to the hydroxyl-producing cathode, causing at least partial dissolution of metal silicate in the basic catholyte (rather or in addition to the acidic anolyte), thus producing metal hydroxide. In both of the preceding embodiments, one or more compounds of silicon that may include silicic acid and silica can be produced. A metal silicate may be both acid- and base-soluble, in which case dissolution of the metal silicate and the production of metal hydroxide may be facilitated by placing a mass of metal silicate in close proximity to the anolyte and catholyte simultaneously.

One embodiment of the present invention provides a system for removing carbon dioxide from the atmosphere or other gas mixture. This embodiment includes at least one of the embodiments described above where the metal hydroxide solution formed is contacted with atmospheric $CO_2$ or other $CO_2$-containing gas mixture in order to absorb and remove some or all $CO_2$ from such gas mixtures. This proceeds via reaction of the excess metal hydroxide with $CO_2$ or its hydrated form, carbonic acid, to form metal carbonate and/or metal bicarbonate. Such metal carbonates and bicarbonates can be used to store or sequester carbon from the atmosphere or other gas mixture, or may have other industrial, chemical, manufacturing, agricultural, aquacultural, or environmental uses. By analogy it is understood that the preceding system is relevant for absorbing and neutralizing other gases whose hydrated or unhydrated forms can react with metal hydroxide to form metal salts of those gases. Such gases include acid gases such as $SO_2$, $H_2S$, and $NO_2$.

Other embodiments of the invention place the formed metal hydroxide solution in a separate, natural, or artificial gas-solution contactor to facilitate $CO_2$ or acid gas removal from a gas mixture. This includes the use of a natural or artificial water body as both the source of the initial solution to be electrolyzed as well as the recipient of the metal hydroxide solution produced. In this way the hydroxide once place in the water body is passively contacted with the air or a gas mixture at the water body's surface thus absorbing $CO_2$ or other acid gases from the atmosphere. Such water bodies include oceans, bays, lagoons, lakes, rivers, and any other body of water whose natural or artificially added ion content affords the electrochemical processes described. Underground water of naturally or artificially sufficient ion content may also be used for this purpose where it is electrolyzed in the presence of naturally or artificially emplaced metal silicate, and the resulting metal hydroxide solution contacted with the atmosphere or other gas mixture above or below ground using made-made apparatus or natural or artificial water bodies as gas contactors. In the preceding embodiments, the resulting metal ions, metal hydroxide, or metal salts formed can be left in solution, removed and used for various chemical, industrial, manufacturing, agricultural, aquacultural, or environmental purposes, or discarded. On such manufacturing use is to chemically, electrochemically, or thermally reduce or extract the metals contained in the preceding metal ions, metal hydroxides, or metal salts produced to form solid metal or alloys thereof.

In other embodiments the electrochemical process is used as a means of penetrating, excavating, or reducing in mass metal silicates. This is achieved by forming and positioning the electrodes next to or inside of a metal silicate mass such that the acid and/or base they generate dissolves the metal silicate with which they are contacted. For example, the electrochemical apparatus could be inserted and operated within a natural, underground metal silicate mineral stratum for purposes of penetrating the stratum and producing and removing metal ions and compounds for further processing and use above ground.

Hydrogen gas ($H_2$) may be produced from the electrochemical cell, and this valuable gas can be collected. Note that because a $CO_2$-absorbing solution (hydroxide) can be produced simultaneously with such $H_2$ production, certain embodiments of this invention will consume $CO_2$ while generating $H_2$. That is, the $H_2$ production process is carbon consumptive or "carbon-negative", in contrast to the direct or indirect production of significant quantities of $CO_2$ in the present-day commercial manufacture of $H_2$ ("carbon-positive" $H_2$).

Oxidative gases such as $O_2$ or $Cl_2$ can be produced in the course of the invention's solution electrolysis and these gases can be used for chemical, industrial, manufacturing, or other purposes. Note that as in the case of $H_2$ generation above, certain embodiments of the invention will allow the production of $O_2$ or $Cl_2$ to be carbon-negative, in contrast to current commercial production methods of these gases. On the other hand, the reduction or elimination of such gas emissions from the electrolysis can be accomplished via the use of oxygen reduction electrodes, gas diffusion electrodes, air electrodes, certain electric current densities, or by other methods.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

United States Published Patent Application No. 2009/0038955 for electrochemical formation of hydroxide for enhancing carbon dioxide and acid gas uptake by a solution discloses a system for forming metal hydroxide from a metal carbonate utilizing a water electrolysis cell having an acid-producing anode and a hydroxyl-producing cathode immersed in a water solution of sufficient ionic content to allow an electric current to pass between the hydroxyl-producing cathode and the acid-producing anode. United States Published Patent Application No. 2009/0038955 is incorporated herein in its entirety for all purposes. Unlike the method and apparatus described in USPA 2009/0038955, the present invention uses a metal silicate (rather than a metal carbonate) to produce metal hydroxide by exploiting the strong pH gradients in certain electrochemical cells to facilitate pH-sensitive metal silicate dissolution. Specifically, it is known that the dissolution rate of many metal silicate minerals can be significantly increased in the presence of acids (e.g., U.S. Pat. No. 3,338,667; USPA 2005/0180910; 2010/0051859), chemical bases (e.g., USPA 2004/0213705; 2008/0112868), or both. It therefore follows that exposing metal silicates to the strongly acidic anolyte, the strongly basic catholyte, or both in certain electrochemical cells such as those capable of water electrolysis or oxygen reduction (e.g., U.S. Pat. No. 7,566,388) would allow dissolution to proceed at significantly higher rates than would occur in more pH neutral solutions. Furthermore, the present invention allows such metal silicate dissolution and metal hydroxide formation to be closely and efficiently integrated within certain electrochemical cells, as opposed to requiring such metal silicate dissolution and metal hydroxide formation to occur away from or separately from the site of acid or chemical base production. The invention can also avoid the necessity for high temperatures or pressures to assist in the metal silicate dissolution (e.g., USPA 2004/0213705; 2008/0112868).

Once dissolved into ionic constituents, the positively charged metal ions from the metal silicate can migrate toward the negatively charged hydroxyl-rich (specifically $OH^-$-rich) catholyte to form metal hydroxides, while the negatively charged silicate moieties can migrate toward the positively charged, acid-rich (specifically, $H^+$ or $H_3O^+$-rich) anolyte to form silica, silicic acid, or related silicon compounds. For example, possible reactions involving a divalent metal (M) silicate that can dissolve in acid and using a conserved, non-gas-discharging salt dissolved in water as the electrolyte in a water electrolysis cell:

at the anode—

$$H_2O-2e^- \rightarrow 0.5O_2\uparrow +2H^+, +MSiO_3 \rightarrow SiO_2+H_2O+M^{2+}$$ [Reaction 4]

at the cathode—

$$2H_2O+2e^- \rightarrow H_2\uparrow +2(OH)^-, +M^{2+} \rightarrow M(OH)_2$$ [Reaction 5]

with a net reaction—

$$MSiO_3+2H_2O+DC\ electricity \rightarrow H_2\uparrow +0.5O_2\uparrow + M(OH)_2+SiO_2$$ [Reaction 6]

An example of possible reactions involving a divalent metal silicate that can dissolve in basic conditions and using a non-gas-discharging saline electrolyte:

at the cathode—

$$2H_2O+2e^- \rightarrow H_2\uparrow +2OH^-, +MSiO_3 \rightarrow M(OH)_2+SiO_3^{2-}$$ [Reaction 7]

at the anode—

$$H_2O-2e^- \rightarrow 0.5O_2\uparrow +2H^+, +SiO_3^{2-} \rightarrow SiO_2+H_2O$$ [Reaction 8]

net reaction—

$$MSiO_3+2H_2O+DC\ electricity \rightarrow H_2\uparrow +0.5O_2\uparrow +M(OH)_2+SiO_2$$ [Reaction 9]

Alternatively, the presence of metal silicate near or around the acidic anode could serve to absorb or neutralize the acid produced there, again leading to a buildup of metal hydroxide in solution. For example, if the electrolyte is composed of metal salt such as sodium sulfate, typical electrolysis of the solution would result in sulfuric acid production at the anode, and sodium hydroxide production at the cathode. Normally, the acid and base would react and neutralize each other, reforming and conserving the metal salt electrolyte. However, if metal silicate were allow to react with and neutralize the sulfuric acid thus forming metal sulfate, sodium hydroxide would proportionately go unneutralized in the catholyte, thus generating excess sodium hydroxide in solution. In this instance the metal hydroxide formed is derived from the metal salt of the electrolyte rather than from the metal silicate. If $M_s$ represents a divalent metal contained in a metal silicate and $M_e$ represents a monovalent metal and X a divalent anion as contained in the dissolved, non-gas discharging metal salt ($M_{e2}X$) composing the electrolyte, then potential reactions forming excess metal hydroxide could include:

salt and water splitting:

$$M_{e2}X+4H_2O+DC\text{ elect.}\rightarrow 2H_2\uparrow+O_2\uparrow+H_2X+2M_eOH \quad \text{[Reaction 10]}$$

acid neutralization with metal silicate:

$$M_sSiO_3+H_2X\rightarrow M_sX+H_2SiO_3 \quad \text{[Reaction 11]}$$

net reaction forming excess metal hydroxide:

$$M_{e2}X+4H_2O+M_sSiO_3+DC\text{ elect.}\rightarrow 2H_2\uparrow+O_2\uparrow+M_sX+H_2SiO_3+2M_eOH \quad \text{[Reaction 12]}$$

Metal silicates can also be composed of mono- or trivalent or higher valence metals as well as multi-metal and multi-silicate complexes where the composition and stoichiometry of the preceding elements and compounds vary from that shown. "Metal" here is defined as any element in the group IA, IIA, IIIA, IVA, IB, IIB, IIIB, IVB, VB, VIB, VIIB, or VIIIB elements of the periodic table, and where the metal can exist in the forms of metal silicate, metal hydroxide, and metal carbonate and/or bicarbonate.

The silicate moiety of a metal silicate molecule or mineral is composed of silicon and oxygen in the atomic ratio of $O/Si\geq 2$. Silicon compounds extracted or formed from the metal silicate during the metal silicate dissolution process can include $SiO_2$, $H_4SiO_4$, and/or other chemical forms or complexes that may also include metal atoms.

Once formed, the metal hydroxide could be removed for further use or could be used in situ. Specific membranes, filtration, or gravimetric methods could be used to facilitate the separation and/or removal of the hydroxide. If used for $CO_2$ mitigation, the reaction of, for example, a divalent metal hydroxide with $CO_2$ would proceed predominantly via:

$$M(OH)_2+2CO_2\rightarrow M(HCO_3)_2 \text{ at pH}<9, \quad \text{[Reaction 13]}$$

or $$M(OH)_2+CO_2\rightarrow MCO_3+H_2O \text{ at pH}>9 \quad \text{[Reaction 14]}$$

Depending on the type and concentration of the metal bicarbonate or carbonate formed, it could be in solid and/or dissolved form. Divalent metals typically do not form solid bicarbonates. The ability of many metal carbonates and some metal bicarbonates to precipitate from solution as solids can facilitate the harvesting and/or storage procedure as well as allow recycling of the remaining electrolyte solution.

Unlike the invention described in USPA 2009/0038955 that uses mineral carbonate as a metal source, the present invention allows metal carbonate as well as metal bicarbonate formation to be employed for net $CO_2$ capture and sequestration. The efficiency of carbon capture and sequestration per mol of metal atoms, however, is twice as high when metal bicarbonate rather than metal carbonate is formed. In any case such compounds could be used to store the captured carbon, or these compounds can be harvested and used for industrial, chemical, manufacturing, agricultural, aquacultural, environmental, or other uses, including metal extraction via methods such as chemical, electrolytic, or thermal metal reduction.

By analogy, hydrated acid gases other than $CO_2$ can react with the metal hydroxide produced above to form metal salts, thus removing said acid gases from the air or other gas mixture and sequestering them from the atmosphere. Examples of acid gases that form acids when hydrated include $H_2S$, $SO_2$, and $NO_2$ where the acids formed in solution can include $H_2SO_4$ and $HNO_3$. These then can react with metal hydroxides to form metal salts, for example in the case of a divalent metal hydroxide:

$$H_2SO_4+M(OH)_2\rightarrow MSO_4+2H_2O \quad \text{[Reaction 15]}$$

$$2HNO_3+M(OH)_2\rightarrow M(NO_3)_2+2H_2O \quad \text{[Reaction 16]}$$

The metal salts formed may be used to sequester the original gases and/or may have industrial, chemical, manufacturing, agricultural, aquacultural, environmental, or other uses including metal extraction using methods such as chemical, electrolytic, or thermal metal reduction.

If the hydroxide produced is to be used to mitigate one or more acid gases, contacting the acid gas with the hydroxide could occur within the confines of the electrolytic cell or could occur after the hydroxide is removed from the cell in solid or dissolved form and contacted with the acid gas. In either case the contacting of acid gases with the hydroxide could be enhanced via the use of various, well-known contacting methods (e.g., bubbling, aeration, spraying, mixing). The resulting metal salts produced by such contacting could be removed in dissolved or solid form depending on the type of salt and solution conditions, for example depending on salt, type, concentration, and pH. Removal of solid metal salts from solution (e.g., via precipitation) would allow recovery of solution that could potentially be retained or recycled for further use as an electrolyte or for other purposes.

The replenishment of water in the electrolysis cell would be required to offset any loss of water during operation of the electrochemical cell. Also, diverting the produced $H_2$ to the anolyte or diverting the produced $O_2$ to the catholyte would facilitate the reformation of water within the electrochemical cell via $H_2+0.5O_2\rightarrow H_2O$. This would reduce or eliminate the need to replenish water and also reduce the overall energy requirement of the system by reducing or eliminating gas evolution from the electrochemical cell. Another way to reduce $H_2$ emission and energy consumption is to employ an oxygen reduction cathode (e.g., U.S. Pat. No. 7,566,388) in which cathodic hydroxyl production proceeds via $0.5O_2+H_2O+2e^-\rightarrow 2OH^-$ rather than via $2H_2O+2e^-\rightarrow H_2+2OH^-$ as in the case of water electrolysis. Use of an oxygen reduction cathode, however, requires a source of $O_2$, such as from air or the $O_2$ generated at the anode.

Any $H_2$ produced at the cathode could also be collected and used or marketed for fuel, chemical feedstock, or other purposes, defraying the overall cost of the process. The same is applicable to any gases produced at the anode. If the electrolyte used in the process is composed of a non-gas-discharging salt (e.g., $Na_2SO_4$), the gas discharged would be $O_2$ originating from $H_2O$. If the electrolyte salt is gas-discharging, e.g., NaCl, then $Cl_2$ would likely be emitted. If undesirable, this can be avoided by the use of low voltage, high current densities, or oxygen-selective electrodes (e.g., U.S. Pat. No. 4,180,445) in the electrolysis process. The gases produced at the anode such as $O_2$ or $Cl_2$ could have commercial value that could help offset overall process costs. In addition, one or more silicon compounds produced by the process, including $SiO_2$, $H_4SiO_4$, as well as silica polymorphs could be have value and be harvested from the electrolyte.

Any source of DC electricity of sufficient current and voltage for generating an acidic anolyte and basic catholyte of sufficient strength for dissolving metal silicates can be used for the process. However, if $CO_2$ mitigation is the primary objective, then the use of electricity derived from non-$CO_2$-generating sources (e.g., wind, solar, wave, tidal, ocean thermal, geothermal, biomass, nuclear, etc) would maximize the net $CO_2$ mitigation effect.

Because there can be a strong pH gradient between the anode and cathode in an electrochemical cell, the position or placement of the metal silicate within the cell will affect the silicate's dissolution rate. Those metal silicates with acid sensitive dissolution should be placed around or near the acid-producing anode, while base-sensitive silicates should be placed around or near the basic, hydroxyl-producing cathode. Those metal silicates displaying both acid and base dissolution sensitivity can be place at either or both electrodes. It may be necessary to use a solution-porous vessel or container to hold the metal silicate mass in position. In order to facilitate solution contacting, the metal silicate should be present in a porous form such as a powder, sand, aggregate, or other particle forms or as a sintered form of the preceding. Since the process consumes the metal silicate, ways of replenishing this reactant are needed including batch or continuous feed of the material to the electrochemical cell. Because of their abundance and low cost, the most likely source of metal silicates for the process would be mineral forms as naturally found in the earth.

Alternatively, the vessel or container for the electrochemical process could be that of the metal silicate mass itself. For example, electrodes could be placed via borehole within a naturally occurring subterranean mineral silicate mass to which appropriate electrolyte is added and DC electricity applied. In this way mineral silicate dissolution is effected in situ within a mineral stratum, precluding the need to extract and transport the mineral silicate to a site of dissolution, or, conversely, precluding the need to transport acids or bases to the mineral silicate. Any metal ions, metal hydroxides, metal salts, and/or silicon compounds formed (during the dissolution or during subsequent chemical reactions involving the dissolution products) could be removed from the electrolyte in situ, or after the electrolyte with the products has been removed from the mineral mass. For example, a continuous or batch removal to the land surface of the electrolyte from the preceding subterranean electrochemical cell could allow more convenient use or extraction of the metal and/or silicon compounds in the electrolyte above ground. Extraction methods here could include chemical, electrochemical, chromatographic, gravimetric, floatation, or filtration means. Further metal refining of the compounds recovered could be conducted via methods such as chemical, electrolytic, or thermal metal reduction.

Figure 1:
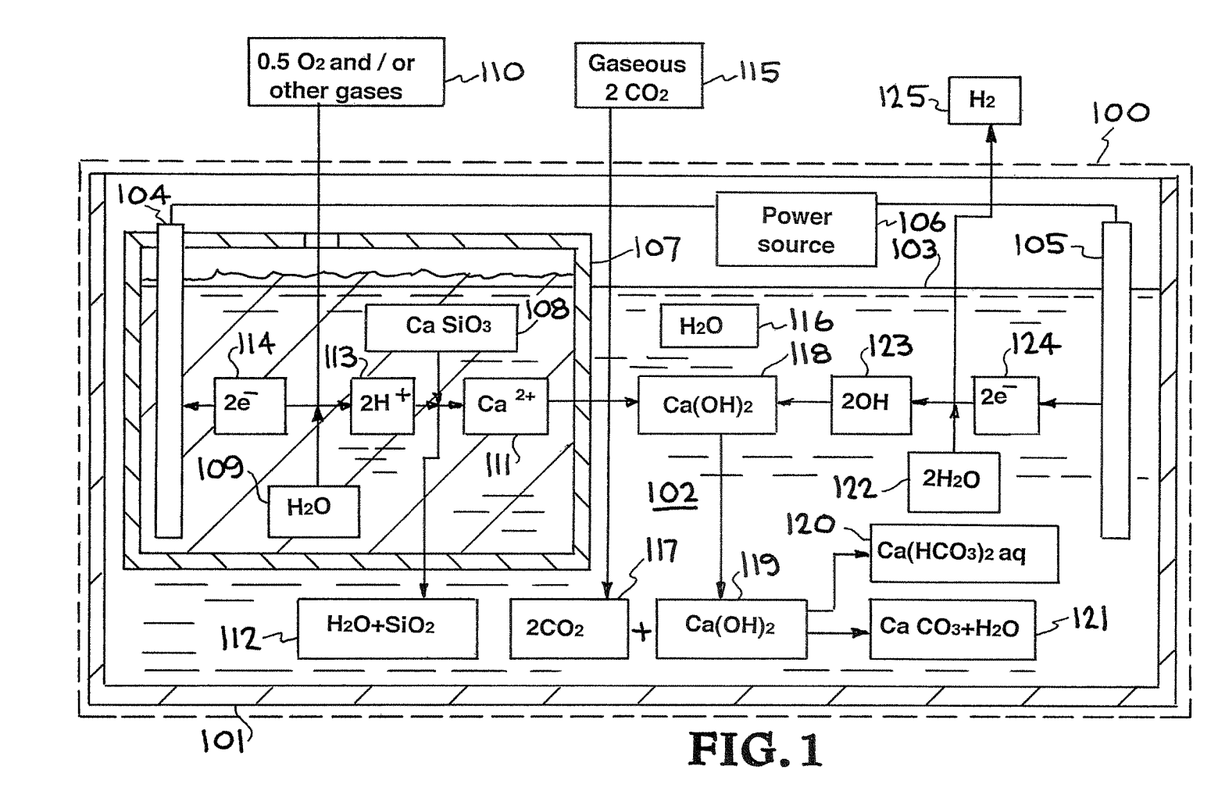
FIG. 1 is a diagrammatic representation of one embodiment of a system of the present invention.

Referring to the drawings and in particular to FIG. 1 a schematic representation of a system constructed in accordance with the present invention is shown. FIG. 1 provides a diagrammatic representation of a system of electrochemically generating metal hydroxide in solution via electrolysis of water in the presence of a metal silicate. The resulting metal hydroxide is used to absorb acid gas from the overlying air space, producing metal salts of the acid gases. The system also generates hydrogen and other gases. The initial system is bounded by a dashed line and designated with the reference numeral 100.

System 100 utilizes a porous container 107 to facilitate the positioning of the metal carbonate near or around the anode 104 under circumstances where the metal carbonate remains in solid or particulate form when placed in the water solution 102. The porosity of the container is such that water molecules and other ions can pass through part or all of the walls of the container 107, but insoluble particles will be retained within the container 107. The porous carbonate container wall can be in whole or in part a membrane, cloth, matrix, grate, filter, sieve, web, screen, or other form of porous material capable of holding solids. All or part of the top surface of the container 107 may be left open to facilitate gas collection or release, to allow replenishment of metal carbonate, and to allow access to the anode 104 if positioned inside the container. The container 107 is filled with pieces or particles composed partly or entirely of metal silicate, in this example calcium silicate 108, and the container submerged and positioned in the water solution 102 such that the solution level 103 is below the top of the calcium silicate mass 108 in the container 107. A cathode 105 is also partially submerged in the water solution 102.

The water solution 102 containing the anode 104 and cathode 105 resides in a larger container 101 capable of holding the water solution 102. The container 101 could be the ocean or a natural or artificial pond, river, stream, reservoir, vessel, cell, or other natural or artificial body or vessel capable of holding the water solution 102. The water solution 102 has an ion content that is high enough to allow electricity to flow between the anode and cathode, the electricity being of sufficient current and voltage to allow the electrochemical splitting of water. The water solution 102 either: 1) naturally has sufficient ion concentration, for example seawater, saline ground water, or saline surface water, or 2) is artificially made sufficiently saline by the addition soluble salts, or by the removal of water (evaporation, desalination, electrodialysis, pressure dialysis, or by other methods). Such salt ions can be metal or non-metal chlorides, sulfates, nitrates, phosphates, carbonates, or any other ions capable of conducting electrical current within the solution.

Electricity is applied from a DC electricity power source 106 through the solution 102 via the anode 104 and cathode 105. Water molecules 109 in the solution 102 are subsequently split into hydrogen ions 113 and molecular oxygen 110, with the resulting electrons 114 transferred to the anode 104. The hydrogen ions 113 then chemically react with the calcium silicate 108 to form silica and water 112 and calcium ions 111. Being positively charged, the calcium ions 111 migrate towards the negatively charged cathode 105. The calcium ions 111 combine with the hydroxyl ions 123 formed at the cathode 105 to produce calcium hydroxide 118.

In one embodiment the metal hydroxide formed, in this example calcium hydroxide 118, can be used to subsequently react with $CO_2$ 117 dissolved in the solution, forming primarily metal bicarbonate 120 when the solution pH is maintained below 9, and predominantly metal carbonate 121 when above pH 9. As this consumption of dissolved $CO_2$ reduces the solution's dissolved $CO_2$ concentration below the saturation state allowed by the overlying gas mixture (e.g., air), some $CO_2$ 115 will diffuse from the gas into the water solution 102, and will react with the metal hydroxide 119 to form predominantly metal carbonate 121 or bicarbonate 120. The net effect is that there will be transfer of $CO_2$ from the overlying gas 115 to the solution, and the $CO_2$ concentration in the overlying gas 115 is thus reduced. By analogy this method can be used to reduce the concentration of other gases that can dissolve in water and can react with the metal hydroxide produced 118. Those gases include certain oxides of sulfur and nitrogen such as $SO_2$ and $NO_2$, as well as $H_2S$. Potential co-benefits of this system include the possible generation of $H_2$ 104, and $O_2$ and/or other oxidative gases 110 such as $Cl_2$.

In the system 100, the anode 104 and cathode 105 can be composed of materials that do not chemically react with the solution or its constituents, including those composed of graphite, stainless steel, nickel, titanium, tungsten, or platinum. The anode 104 may be coated or composed of a material such as manganese dioxide or alloys thereof that preferentially discharges oxygen gas from the electrolyzed water solution rather than other gases. Additionally, it is possible to reduce or eliminate gas emission from the electrolyzed water solution by diverting the hydrogen gas 125 produced at the cathode 105 such that it bathes the anode and is oxidized by contact with the chemical constituents produced at the anode 104. Conversely, oxidizing gases produced at the anode can be diverted to the cathode to oxidize $H_2$ forming water. Another variant employs an oxygen reduction cathode that would eliminate the production of $H_2$ while still generating hydroxyl ions at the cathode.

The metal silicate can be in particulate, granular, powdered, or sintered form so as to allow the water solution and ions to pass through and contact the metal carbonate mass and the anode.

In the system 100, the acid gases such as $CO_2$ 115 that are absorbed by the solution 102 can initially reside in a gas stream or parcel, the gas being air or other gas from a natural origin, or the gas being from an industrial, waste, or other anthropogenic source. The gas may be either passively exposed to the solution or may be actively contacted with the solution by the use of bubbling, stirring, spaying, shaking, mixing, and the like. The addition of certain enzymes to the solution can also be used to facilitate gas transfer into the solution, for example the addition of carbonic anhydrase to enhance $CO_2$ uptake by the solution.

In the system 100, any hydrogen 125, oxygen, chlorine and/or other gases 110 generated by system 100 can be collected and used for chemical, industrial or manufacturing processes or for other purposes, can be stored, or can be discarded. Note that the possible simultaneous production of $H_2$ and oxidative gases with the co-production of a $CO_2$-consuming metal hydroxide solution allows for the production of $H_2$ and oxidative gas to be $CO_2$-consumptive. This is opposed to conventional $H_2$ and oxidative gas production that is $CO_2$-emissions-intensive. The metal hydroxide produced 118 can be used for purposes other than enhancing acid gas absorption by the solution 102. Such purposes include use as a chemical feed stock, the neutralization of acidity, and the elevation of solution pH, for example to effect precipitation of compounds contained in a solution, in particular metal carbonates and hydroxides. Such carbonates and/or hydroxides can be used, for example, in the production of cement or as sources for metal extraction and refining.

The electricity used in system 100 can be derived from the combustion of fossil fuel and/or from non-fossil energy including wind, solar, hydro, wave, tidal, ocean thermal, geothermal, geochemical, biochemical, biomass, or nuclear energy. Non-fossil energy is preferred if maximum net $CO_2$ mitigation by the system is desired.

Example 1: An Apparatus for the Electrochemical Dissolution of Metal Silicate Minerals Forming $H_2$, $O_2$, and Metal Hydroxide for $CO_2$ Removal and Storage A plastic container, made porous to water by many small holes in the containers side, is filled with ultramafic rock (rich in metal silicate minerals) that has been ground to a particle size significantly larger than the container's holes. The container is then suspended in a vat containing a 0.25M solution of $Na_2SO_4$ such that the majority (but not all) of the rock mass is submerged in the solution. A graphite electrode rod (anode) is vertically inserted into the center of the plastic container so that most of the rock mass is penetrated and at least some of the bottom end of the electrode is under the level of the solution while the upper end of the electrode is above the rock mass. A second graphite electrode (cathode) is inserted the same vertical distance into the solution as the anode, at a horizontal distance from the anode that has been predetermined to optimize electric current flow between the electrodes and performance of the system. The anode is connected to the positive terminal of a DC power supply composed of a functioning, sufficiently sized photovoltaic solar panel connected to a controller that can optimize voltage and current delivery to the electrodes. The cathode is connected to the negative terminal of the power supply. Solution electrolysis is allowed to proceed, with the resulting $O_2$ produced at the anode and $H_2$ produced at the cathode separately collected and carefully vented. The acid produced at the anode (resulting from the electrolysis of $H_2O$ to form $O_2$) reacts with and dissolves the ultramafic rock, producing metal ions that either neutralize the acid to form metal salts or migrate to the cathode to form metal hydroxides. In either or both cases dissolved metal hydroxide accumulates in the solution and at a predetermined concentration a portion of the solution, loosely isolated by baffles from anode and cathode, is aerated. The ensuing reaction between the metal hydroxide and atmospheric $CO_2$ forms metal carbonate and bicarbonate that upon reaching saturation will precipitate. Upon settling, the metal carbonate is stored, thus effecting $CO_2$ capture and sequestration from air.

Figure 2:
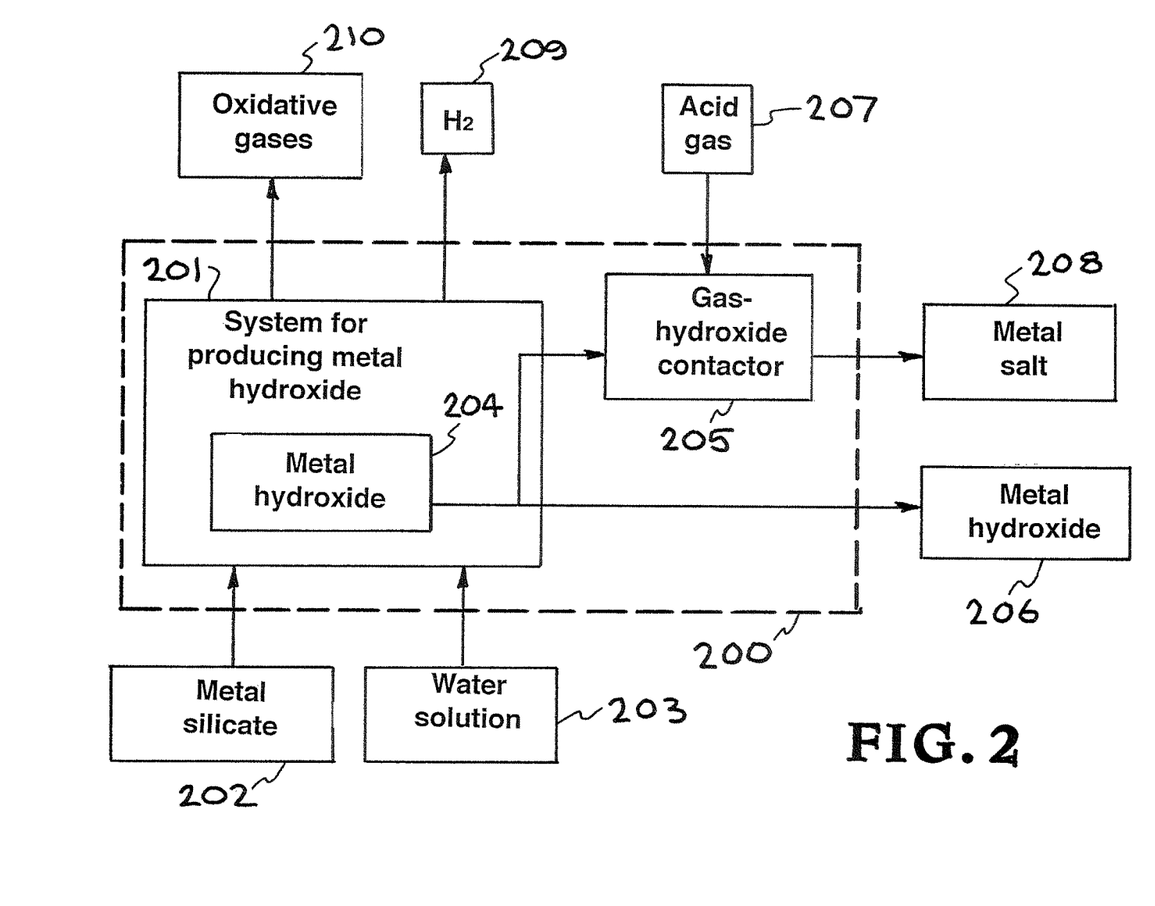
FIG. 2 is a diagrammatic representation of another embodiment of a system constructed in accordance with the present invention.

Referring now to FIG. 2, a diagrammatic representation of another embodiment of a system constructed in accordance with the present invention is shown. This system is designated generally by the reference numeral 200. This system is composed of a unit 201 that performs as described for system 100, and where metal silicate 202 and water solution 203 are periodically or continuously added to replenish the ions, water, and metal silicate consumed by system 100, where such consumption and depletion would otherwise negatively affect the desired performance of the invention. Unlike system 100, however, the metal hydroxide 204 produced, such as calcium hydroxide, can be periodically or continuously removed from unit 201 and: 1) placed in a gas-hydroxide contactor 205; 2) used for other purposes 206 including chemical, industrial, manufacturing, agricultural, aquacultural, or environmental purposes or 3), stored or disposed of. The gas-hydroxide contactor 205 is a natural or artificial structure whose purpose is to facilitate the chemical reaction and absorption of an acid gas 207 such as carbon dioxide from the air, waste gas stream, or other gaseous entity. The resulting solid or dissolved metal salt 208, e.g., calcium bicarbonate or carbonate, is removed from the contactor 205 and is used for industrial, chemical, manufacturing, agricultural, aquacultural, or environmental purposes, or is stored or disposed of. $H_2$ 209, if emitted from system 201, can be collected and used for chemical feedstock, fuel (e.g. in a fuel cell or internal combustion engine), or for other purposes, or stored or discarded. Also, oxidative gases 210 such as $O_2$ or $Cl_2$, if emitted from system 201, can be collected and used for chemical, industrial, manufacturing, or other purposes, or stored or discarded. In this way system 200 allows for the addition of some or all of the starting compounds and the removal of some or all of the end products from system 100, and allows for use or disposal of those end products external to system 100. The method of material addition to or removal from systems 200 and 201 could include pumping, gravity feed, lifting and depositing, venting, or other means of conveyance of solution, gases, and solids.

Example 2: An Apparatus for the Electrochemical Dissolution of Metal Silicate Minerals, with Addition of Reactants and Removal and External Use of Products A plastic container, made porous to water by many small holes in the containers side, is filled with wollastonite (a calcium silicate mineral) that has been ground to a particle size significantly larger than the container's holes. The container is then suspended in a vat of seawater such that the majority (but not all) of the mineral mass is submerged in the solution. Seawater is continuously pumped at a predetermined optimum rate into the vat and then removed by gravity feed back to the ocean such that a constant seawater level in the vat is maintained. A $O_2$-emissions-selective anode is vertically inserted into the center of the container so that most of the rock mass is penetrated and at least some of the bottom end of the electrode is under the level of the solution while the upper end of the electrode is in air above the rock mass. A second, equally sized graphite electrode (cathode) is inserted and held at the same vertical distance into the solution as the anode, at a horizontal distance from the anode that has been predetermined to optimize electric current flow between the electrodes and the performance of the system. The anode is connected to the positive terminal of a DC power supply composed of a functioning, sufficiently sized wind turbine connected to an inverter/controller that can condition and optimize DC voltage and current delivery to the electrodes. The cathode is connected to the negative terminal of the power supply. Seawater electrolysis is then allowed to proceed, with the resulting $O_2$ produced at the anode and $H_2$ produced at the cathode removed from the system by appropriate tubing. These gases are, if necessary, purified and then diverted to a fuel cell to generate electricity and fresh water. Any residual gas emissions are carefully diverted and vented. The acid produced at the anode (resulting from the electrolysis of $H_2O$ to form $O_2$) reacts with and dissolves the wollastonite, producing calcium ions that either 1) neutralize the acid to form calcium salts (allowing NaOH produced at the cathode to accumulate), or 2) migrate to the cathode to form calcium hydroxide. In either or both cases dissolved metal hydroxide accumulates in the solution and accompanies the solution that is continuously removed and discharge into the surface ocean. The ensuing reaction in the ocean between the metal hydroxide and atmospheric or oceanic $CO_2$ forms dissolved metal bicarbonate and secondarily, carbonate, thus effecting $CO_2$ capture and sequestration from the atmosphere, as well as beneficially elevating ocean pH and alkalinity.

Figure 3:
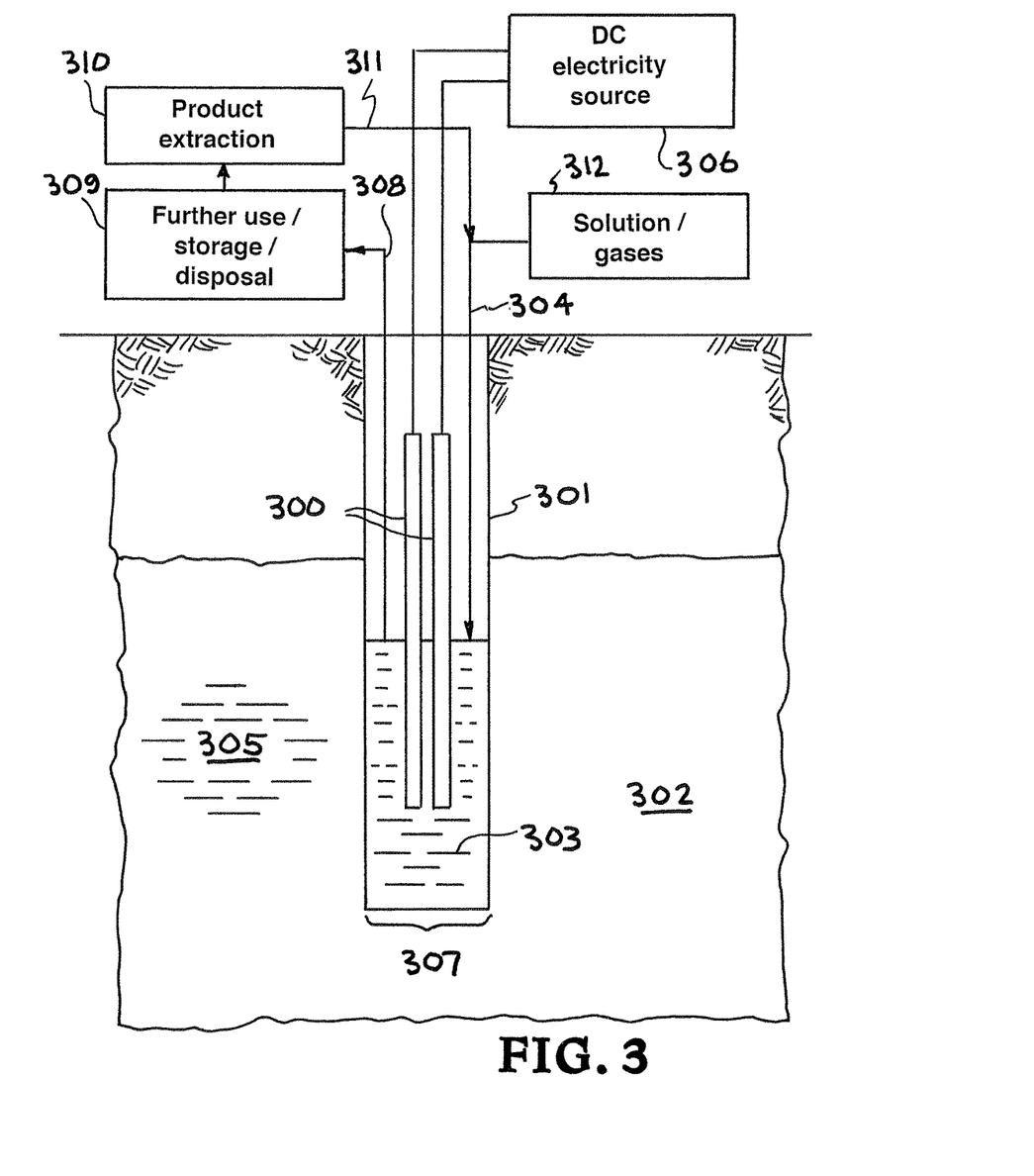
FIG. 3 is a diagrammatic representation of yet another embodiment of a system constructed in accordance with the present invention.

Referring now to FIG. 3, another embodiment of the invention is to insert the electrodes such as those described in FIG. 1 into a natural or artificially emplaced electrolyte solution that is held by a cavity within a naturally existing or artificially emplaced metal silicate mass in order to effect the dissolution of the metal silicate mass and to effect the production of chemical products. For example, electrodes 300 of appropriate shape and composition could be inserted into a borehole 301 that has been vertically drilled into a geologic mineral silicate stratum 302 and which contains a solution 303 of sufficient ion strength, such as the type described in FIG. 1. The solution may be added 304 to the borehole and/or the solution may naturally form or may artificially assisted to form in the borehole from surrounding ground water, for example from saline ground water or brine 305.

DC electricity 306 of appropriate voltage and current flow is applied to the electrodes 300 that are at least partially submerged in the solution within the mineral silicate stratum creating strong pH gradients within the solution. This causes dissolution of the mineral silicate 302 that is in immediate contact with the acidic, and/or basic solutions generated. This dissolution could further excavate or enlarge the space 307 holding the solution 303, one potential outcome being the deepening of the borehole, thus allowing further penetration and exposure of electrodes 300 and solution 303 into the mineral silicate stratum as the process proceeds. By shaping and/or positioning the electrodes, the size and shape of the space 307 formed can be affected. This embodiment therefore provides a means of penetrating or excavating a mineral silicate mass via electrochemical dissolution.

The solution now containing products of the mineral silicate dissolution, including metal hydroxides and silicon compounds, could be brought to the surface 308 for further use, storage, or disposal 309. Above-ground extraction of products 310 from the solution via chemical, electrochemical, chromatographic, gravimetric, filtration, or other methods could allow return of the product-depleted solution 311 down the borehole if desired. An example of above-ground product use would include placing the metal hydroxide produced into a gas-hydroxide contactor to effect acid gas removal from the contacted gas, for example $CO_2$ removal from air or a waste gas mixture. Conversely, acid gases 312 could be pumped down 304 the borehole 301 and contacted (e.g., bubbling, aeration, mixing) with the metal hydroxide as it resided in the solution 303 contained within the borehole 301. In this case the resulting dissolved metal salts formed in solution could be left in place or the solution brought to the surface 308 for further solution use, extraction, storage, or disposal 309, 310.

Any gases produced during the process including $H_2$ and oxidative gases such as $O_2$ and $Cl_2$ could be vented or otherwise transported 308 through the borehole to the ground surface and extracted for further use, storage, or disposal. The embodiment illustrated in FIG. 3 thus allows for the in situ dissolution of a naturally or artificially amassed metal silicate, and precludes the need to transport such silicates to a dissolution site.

Example 3: An Apparatus for the Electrochemical Dissolution of a Metal Silicate Mineral Stratum and the Extraction of Metals A borehole is drilled through overburden into the upper portion of a 1000 meter thick subterranean rock stratum rich in olivine (an Mg-, Fe-, and Ca-rich silicate mineral). The borehole is partially filled with a solution of $Na_2SO_4$ at a concentration predetermined to optimize the performance of the system. Two stainless steel electrodes, specially formed to optimize performance and rigidly separated by non-electricity-conducting spacers, are lowered to the bottom of the hole such that their ends contact or are in close proximity to the rock stratum. The electrodes are connected by insulated wires to an above-ground DC power supply capable of providing appropriate current and voltage. The ensuing electrolysis at the bottom of the borehole generates strong acidic and basic regimes in the solution that dissolves the olivine, producing silicon compounds, and dissolved metal ions and hydroxides. The solution is continuously pumped above ground where the metal ions and hydroxides and silicon compounds are separated and concentrated by pH adjustment and precipitation. The resulting metal salts and hydroxides are then chemically, electrochemically, or thermally reduced to metal. The metal- and silicon-depleted solution is then returned down the borehole together with any fresh makeup solution required. $H_2$ and $O_2$ generated in the borehole are carefully removed and utilized or vented. Continuous vertical dissolution of the rock allows progressive penetration of the rock stratum by the electrodes and fresh exposure of silicate mineral for the process.

Figure 4:
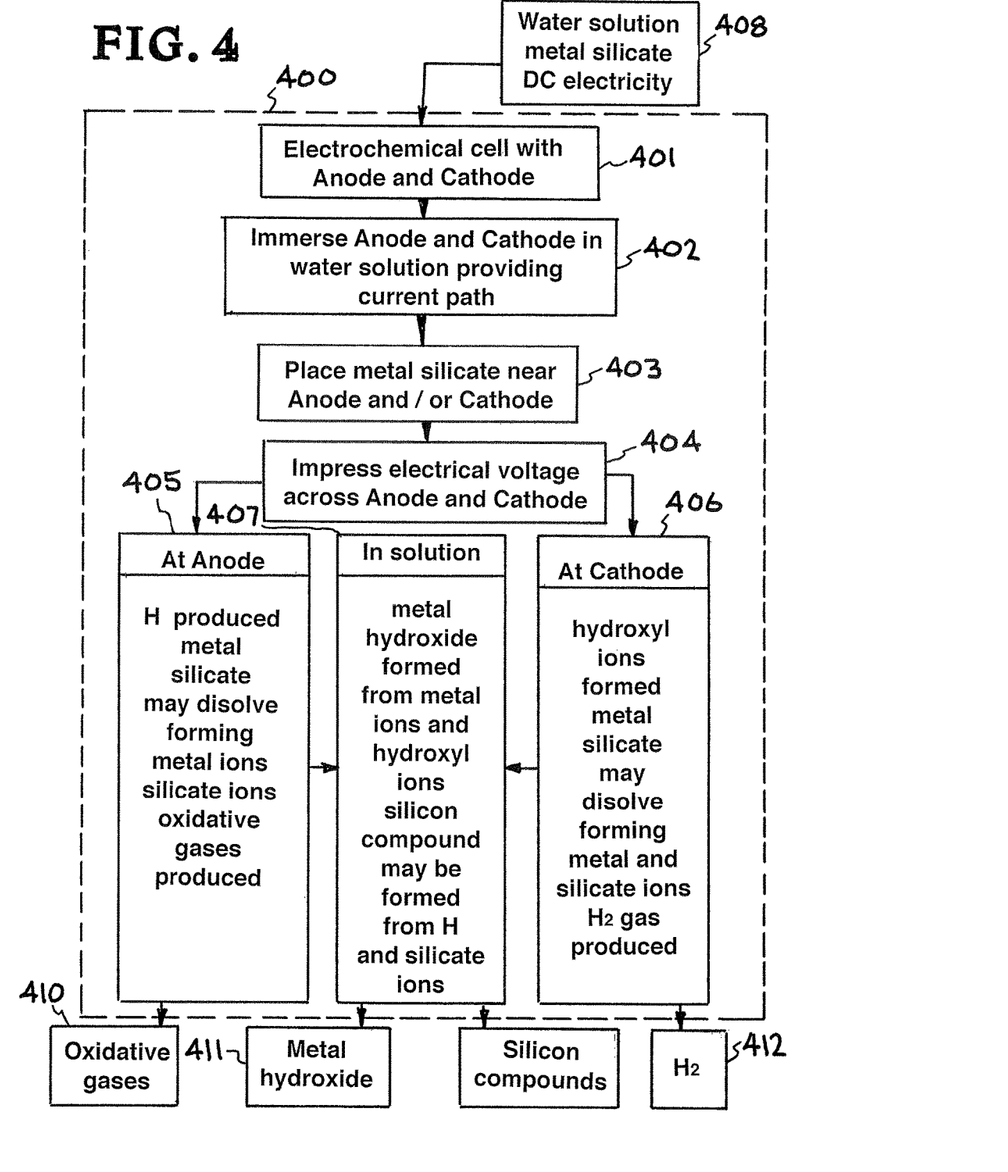
FIG. 4 is a flow chart illustrating an embodiment of a system constructed in accordance with the present invention.

Referring now to FIG. 4, a flow chart illustrates one embodiment of a system constructed in accordance with the present invention. The system is designated generally by the reference numeral 400. The system 400 provides an electrochemical system for dissolving metal silicate, for example a natural metal silicate mineral, and forming dissolve metal hydroxide.

The system 400 provides a method of electrochemically dissolving a metal silicate to make metal hydroxide and other products. The method includes a number of individual steps resulting in the production of metal hydroxides and silicon compounds, and possibly gases including $H_2$, and $O_2$ or $Cl_2$. The method 400 begins by providing water solution, metal silicate, and DC electricity 408 to an electrochemical cell having an acid-producing anode, and a hydroxyl-producing cathode, Step 401. In Step 402 the hydroxyl-producing cathode and the acid-producing anode are immersed in the water solution whose ion concentration is sufficient to provide a current path between the hydroxyl-producing cathode and the acid-producing anode. In Step 403 a metal silicate mass is brought into close proximity to the anode, or cathode, or both depending on the pH sensitivity of the metal silicate to be dissolved. In Step 404 DC electricity is impressed across the anode and cathode of sufficient voltage and current to generate an acidic environment near the anode and a basic environment near the cathode (Step 405). Exposure of metal silicate to one or both of these environments leads to the dissolution of at least some of the metal silicate, depending on the strength of and acid and base generated and the acid- and/or base-sensitivity of the metal silicate's dissolution (Step 405). The hydroxyl ions produced at the cathode (Step 406) combine with the metal ions to produce metal hydroxide 411. Additionally or alternatively the metal ions react with and neutralize the acid produced at the anode to form metal salts, allowing metal hydroxide derived from the water solution to accumulate. The acidity produced at the anode also react with the silicate ions to from silica and water, silicic acid, and/or other silicon compounds. The metal hydroxide, silicon compounds, and any gases produced (410 and 412) may remain or be further used within the electrochemical cell or may be removed for external use, storage, or disposal.

Example 4: A Method of Electrochemically Forming Metal Hydroxide Using Metal Silicate, for Purposes of $CO_2$ Capture and Sequestration From a dock supported above the surface of a natural saline lake (principle ions=NaCl), two electrodes are vertically positioned to partially penetrate the lake surface. The anode is coated with a material (e.g., manganese dioxide) that selectively discharges $O_2$ during saline water electrolysis. The submerged end of this anode is encased in peridotite aggregate (a rock rich in Mg, Fe, and Ca silicate minerals) held in position by a fixed container that is porous to water but not to the peridotite particles. The two electrodes are separated by a horizontal distance predetermined to optimize the performance of the system. The electrodes are connected to a DC electricity power supply composed of appropriately sized solar panels and a voltage/current regulator to optimize performance. Electrolysis of the brine ensues generating $H_2$ and hydroxyl at the cathode and $O_2$ and acid at the anode. The gases are separated and stored for further use. The acid reacts with and dissolves the olivine producing silicate ions and metal ions. The metal ions form metal salts of the acid allowing metal hydroxide derived from the brine to accumulate at the cathode. Alternatively or additionally, the metal ions react with the hydroxyl formed at the cathode to form metal hydroxide. The silicate ions react with the anodic acid to form silicic acid or silica or polymorphs thereof, some of which may reach saturation and precipitate from solution. The metal hydroxide subsequently reacts with $CO_2$ that is dissolved in the lake, forming metal carbonates or bicarbonates. As the partial pressure of the lake's dissolved $CO_2$ falls below that of the atmosphere via the preceding reaction, atmospheric $CO_2$ diffuses into the lake and is also consumed, thus effecting $CO_2$ capture and sequestration from the atmosphere. The preceding can be facilitated by artificial aeration of the affected lake water. Upon reaching saturation, the resulting metal carbonates and/or bicarbonates may precipitate. These may then be harvested for further use from the lake bottom or from submerged platforms or containers positioned beneath the affected lake water.

Figure 5:
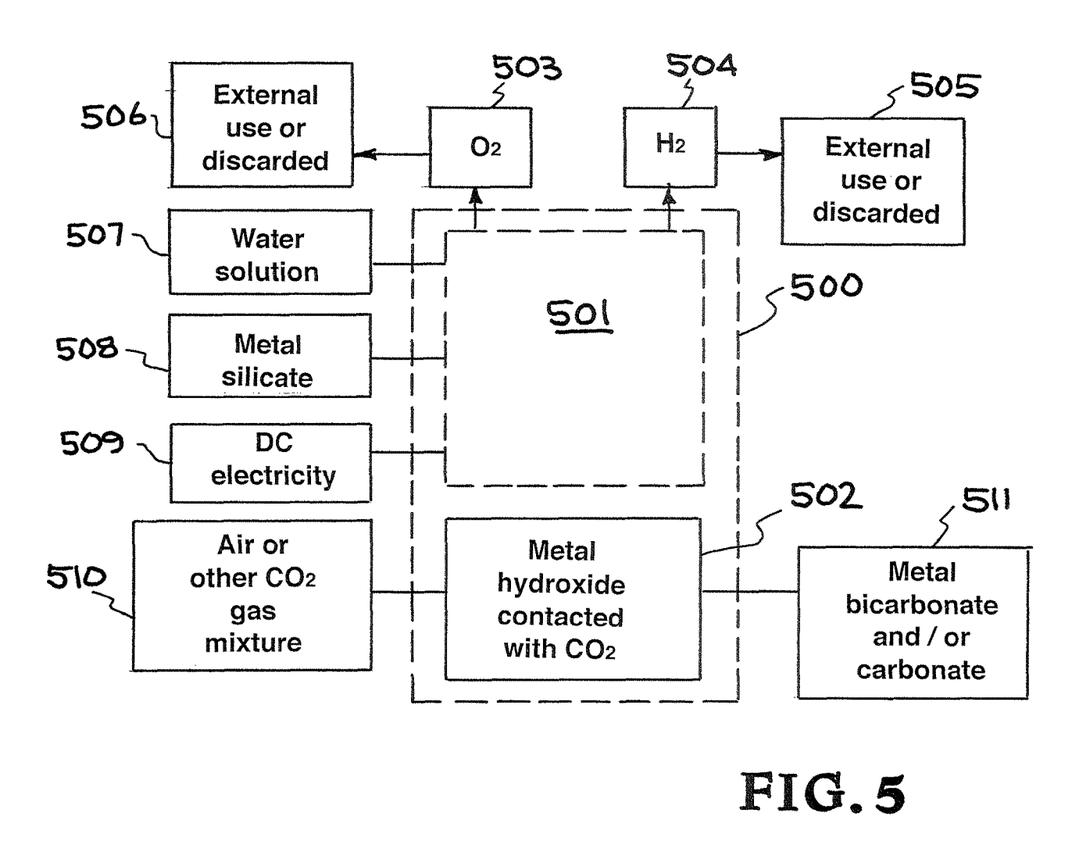
FIG. 5 is flow chart illustrates another embodiment of a system constructed in accordance with the present invention.

Referring now to FIG. 5 a flow chart illustrates another embodiment of a system constructed in accordance with the present invention. The system is designated generally by the reference numeral 500. The system 500 provides a method for removing carbon dioxide or other acid gases from the atmosphere or other gas mixture while optionally producing hydrogen and oxidative gases. System 500, contains a system 501 that performs as the system shown in FIG. 4. Water solution 507, metal silicate 508, and DC electricity 509 are inputs to system 501.

In this embodiment the metal hydroxide produced by System 501 is contacted 502 with air or other gas mixture (510) to chemically react with and remove some or all of the $CO_2$ contained in air or gas mixture. A catalyst such as carbonic anhydrase may be used in the metal hydroxide solution to hasten the absorption and hydration of $CO_2$. In any case the $CO_2$ reacts with the dissolved metal hydroxide to predominantly form metal bicarbonate (511) when solution pH below 9. The formation of metal carbonate will dominate at pH greater than 9. The metal carbonate or bicarbonate formed 511 may remain in System 500 or may be removed for use, storage, or may be discarded. By analogy the preceding system is also relevant for absorbing and neutralizing other gases whose hydrated or unhydrated forms can react with metal hydroxide to form metal salts of those gases. Such gases include $SO_2$, $H_2S$, and $NO_2$.

The hydrogen (504) and any oxidative gases (503; in this example $O_2$) produced by System 501 may remain within System 500 or may be removed for external use, storage, or may be discarded 505 and 506.

System 500 therefore has the ability to couple acid gas mitigation (e.g., $CO_2$ mitigation) with hydrogen and oxidative gas production (e.g., $O_2$ production). Conversely, it is possible to reduce or eliminate gas evolution from the electrochemical cell through the use of an oxygen reduction cathode, or of gas diffusion anodes or cathodes configured to allow consumption of some or all of the produced $H_2$ and $O_2$ via internal $H_2$ oxidation with the internally produced $O_2$ within the electrochemical cell, producing water.

The container could be the ocean or a natural or artificial pond, river, stream, reservoir, vessel, cell, or other natural or artificial body or vessel capable of holding the water solution. The water solution has an ionic content that is high enough to allow electricity to flow between the anode and cathode, the electricity being of sufficient current and voltage to allow the electrochemical splitting of water or the reduction of oxygen. The water solution either: 1) naturally has sufficient ion concentration, for example seawater, saline ground water, or saline surface water, or 2) is artificially made sufficiently saline by the addition salt ions or by the removal of water (evaporation, desalination, electrodialysis, pressure dialysis, or by other methods). Such salt ions can be metal or non-metal chlorides, sulfates, nitrates, phosphates, carbonates, or any other ions capable of carrying electrical current within the solution.

Example 5: A Method of Electrochemically Forming Metal Hydroxide Using Metal Silicate, for Purposes of $H_2$ Production and $CO_2$ Capture and Sequestration from the Atmosphere The hold of a large, specially designed sailing ship is partially filled with granulated olivine (a metal silicate mineral). Into this olivine mass are vertically positioned anodes (of a composition that selectively discharge $O_2$ during seawater electrolysis) and stainless steel cathodes whose number, design, and position are such that will allow efficient electrolysis of seawater (without chlorine generation) within the porous olivine mass and allow the safe recovery of the resulting $H_2$ and $O_2$ gases. The ship's hold is then partially flooded with seawater to a depth below the top surface of the olivine mass, at least partly submerging all of the electrodes. The portion of the ship's hold containing seawater is well baffled to minimize water surges. Each anode is connected to the positive terminal of a DC power supply that is composed of a series of sufficiently sized, above-deck photovoltaic solar panels as well as helical wind turbines each connected to a controller that can condition and optimize voltage and current delivery to the electrodes to perform seawater electrolysis. The cathodes are then connected to the negative terminal of the power supply. Once the electrodes are powered, seawater electrolysis then proceeds, with the resulting $O_2$ produced at the anode and $H_2$ produced at the cathode carefully separated and removed from the system by appropriate gas plumbing. The $H_2$ is then purified, pressurize, and either is used as fuel in onboard fuel cells or internal combustion engines, or is stored for later offloading in port. The $O_2$ may also be used, stored, or vented. Any residual gas emissions are carefully diverted and vented. The acid produced at the anode (resulting from the electrolysis of $H_2O$ to form $O_2$) reacts with and dissolves the olivine, producing magnesium and iron ions that either 1) react with the acid produced at the anode to form metal salts (allowing NaOH produced at the cathode to accumulate), or 2) migrate to the cathode to form metal hydroxide. In either or both cases dissolved metal hydroxide accumulates in the solution and accompanies the solution that is continuously or periodically discharged through the ship's hull into the surface ocean, replaced by fresh seawater drawn into the hold. The ensuing reaction in the ocean between the metal hydroxide and oceanic or atmospheric $CO_2$ forms dissolved metal bicarbonate and secondarily, carbonate, thus effecting $CO_2$ capture and sequestration as well as beneficially elevating ocean pH and alkalinity. The addition to the ocean of hydroxides and salts containing soluble Mg and Fe as well the addition of soluble silica may fertilize and stimulate marine photosynthesis, thus further increasing $CO_2$ uptake, conversion, and storage by the ocean. The ship periodically returns to port for maintenance, and to offload $H_2$ and acquire new olivine, or is tended by another vessel for this purpose. Use of sails to power the ship avoids combustion of fossil fuel and thus maximizes net $CO_2$ capture and sequestration effected. The ship may be manned, autonomously unmanned, or remotely controlled.

Experimental Demonstration

The lower end of a graphite anode rod (2 mm diam.×17 cm long) was encased in 11 to 12 grams of either powdered wollastonite ($CaSiO_3$; supplied by NYCO Minerals, Inc, Willsboro, N.Y.) or powdered ultramafic silicate mineral standard (UM-4, Canadian Centre for Mineral and Energy Technology, Ottawa, Canada). Together with a graphite cathode rod (2 mm diam.×17 cm long), the electrodes were held vertically in a 300 milliliter solution of 0.25 molar $Na_2SO_4$ such that most but not all of the mineral mass was submerged in the solution. With both vertical electrodes penetrating the solution by an equal distance (5.5 cm) and horizontally separated from each other by 5.7 cm, they were attached to a DC power supply. After an initial pH measurement of the solution, the power supply was turned on and the closed circuit voltage and amperage monitored, averaging 3.6V and 5-10 mA during the ensuing electrolysis. Solution electrolysis was evident via a very small evolution of gas bubbles (presumably $H_2$ generated via the electrolysis of solution $H_2O$, also forming $OH^-$ in solution) noted along the submerged portion of the naked cathode. After either 0.5 or 1.5 hrs of electrolysis, the DC electricity was turned off and the solution pH measured. The solution was then bubbled with air at a rate of 0.4 L/min overnight (20-26 hrs) and the pH again measured. A 45 milliliter sample was then taken for analysis of total dissolved inorganic carbon concentrations. An identical experiment was also conducted, but in the absence of silicate mineral powder encasing the anode (control experiment).

Significant increases in solution pH and $[OH^-]$ were obtained at the end of electrolysis when either silicate mineral was present, relative to the control experiment (Table 1). Solution pH reached as high as 11.1 in the UM-4 treatment after 1.5 hrs of electrolysis (Table 1). This equated more than a 3 millimolar increase in $[OH^-]$ relative to the control treatment. Overnight aeration of the solutions lead to significant decreases in solution pH and as much as an 8 millimolar increase in total dissolved inorganic carbon (DIC) concentration (Table 1). Such hydroxide neutralization and DIC increase presumably occurred primarily via the reaction: $CO_2$ (in air)+$OH^-\rightarrow HCO_3^-$ (in solution). The balancing cations were metal ions derived from the silicate minerals and/or derived from the metal salt of the electrolyte. These results demonstrate that the electrolysis of a saline solution in the presence of a silicate mineral strategically placed around the acidic anode can: 1) significantly increase the production of hydroxide in solution, and 2) this hydroxide in turned can be used to absorb $CO_2$ from air.

TABLE 1

| Mineral | electrolysis time, hrs | pH, initial | pH, end of electrolysis | $[OH-]$, uM | pH, end of aeration | DIC, uM |
| --- | --- | --- | --- | --- | --- | --- |
| none | 1.5 | 6.5 | 5.8 | 0.016 | 6.8 | 425 |
| wollastonite | 0.5 | 6.5 +− 0.05 | 10.4 +− 0.1 | 697 +− 139 | 7.6 +− 0.1 | 2392 +− 187 |

TABLE 1-continued

| Mineral | electrolysis time, hrs | pH, initial | pH, end of electrolysis | [OH−], uM | pH, end of aeration | DIC, uM |
|---|---|---|---|---|---|---|
| ultramafic mineral | 0.5 | 6.5 | 10.6 | 1000 | 8 | 3151 |
| ultramafic mineral | 1.5 | 6.3 | 11.1 | 3162 | 8 | 8171 |

Table 1 legend. Solution pH, hydroxyl concentrations, and total dissolved inorganic carbon concentrations under the conditions specified. Wollastonite and ultramafic minerals are naturally occurring metal silicates. OH⁻ concentration, [OH⁻], was calculated from pH. Values for the wollastonite, 0.5 hr treatment are means and standard deviations ("+−" values) of two identical experiments.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for forming metal hydroxide, comprising:
a first container that has a top, said first container containing insoluble particles;
a second container that is larger than said first container wherein said first container is located inside of said second container, wherein said first container is a porous container that includes porous container walls that extend entirely around said first container except for said top and wherein said porous container walls are made of a grate having a porosity such that water molecules and ions can pass through said grate but insoluble particles can not pass through said grate and said insoluble particles will be retained within said first container;
a hydroxyl-producing cathode located inside said second container outside of said first container;
hydroxyl ions produced by said hydroxyl-producing cathode;
an acid-producing anode located inside said first container;
acid produced by said acid-producing anode;
a direct current electricity source connected to said hydroxyl-producing cathode and said acid-producing anode;
direct current electricity produced by said direct current electricity source in a direct current electricity path between said hydroxyl-producing cathode and said acid-producing anode;
a metal silicate mass located inside said first container, wherein said metal silicate mass is a metal silicate mass that has been ground, powdered, fractured, or drilled;
metal silicate contained in said metal silicate mass that is contacted by said acid produced by said acid-producing anode, or by said hydroxyl ions produced by said hydroxyl-producing cathode, or by both said acid produced by said acid-producing anode and by said hydroxyl ions produced by said hydroxyl-producing cathode, wherein said metal silicate constitutes pieces or particles composed partly or entirely of metal silicate;
a water solution located inside said first container and said second container, said water solution having an ion concentration, wherein said ion concentration is sufficient to allow said direct current electricity to pass in said direct current electricity path between said acid-producing anode and said hydroxyl-producing cathode; and
wherein said first container that is a porous container with porous container walls is located inside of said second container with said porous container walls inside of said second container, said porous container containing said water solution and containing said acid-producing anode, said metal silicate mass, and said metal silicate wherein said porous container walls are immersed in said water solution inside said first container and said second container, wherein said hydroxyl-producing cathode is located in said second container outside of said first container that is a porous container;
wherein said acid-producing anode and said hydroxyl-producing cathode are at least partially submerged in said water solution;
wherein said direct current electricity is applied across said acid-producing anode and said hydroxyl-producing cathode, said direct current electricity being of sufficient current and voltage to generate said hydroxyl ions at said hydroxyl-producing cathode and generate said acid at said acid-producing anode, said acid or said hydroxyl ions being of sufficient concentration to convert at least some of said metal silicate into metal ions and silicate ions;
wherein said silicate ions react with said acid produced by said acid-producing anode and form silica or silicic acid; and
wherein said metal ions react with said hydroxyl ions produced by said hydroxyl-producing cathode to form the metal hydroxide.

2. The apparatus of claim 1 further comprising metal hydroxide storage operatively connected to said water solution located inside said second container wherein said metal hydroxide is stored in said metal hydroxide storage.

3. The apparatus of claim 1 wherein said metal silicate is calcium silicate, and wherein said metal ions are calcium ions that react with said hydroxyl ions to form calcium hydroxide.

4. The apparatus of claim 1 wherein said water solution is a water solution derived from the ocean and wherein said water solution derived from the ocean has an ion concentration sufficient to allow said direct current electricity to produce acid at said acid-producing anode and produce hydroxyl ions at said hydroxyl-producing cathode.

5. The apparatus of claim 1 wherein said direct current electricity source is a direct current electricity source that produces direct current electricity which is derived from coal, natural gas, oil, wind, solar, hydro, wave, tidal, ocean thermal, geothermal, geochemical, biochemical, biomass, or nuclear.

6. The apparatus of claim 1 further comprising acid gases in said first container produced by said acid produced by said acid-producing anode wherein said acid gases are reacted with said metal hydroxide to form metal salts.

7. The apparatus of claim 6 further comprising storage operatively connected to said metal salts and wherein said metal salts are stored in said storage.

8. The apparatus of claim 6 further comprising a processing system and wherein said metal salts are processed by said processing system to concentrate said metal salts.

9. The apparatus of claim 1 wherein said acid-producing anode is placed in contact with said metal silicate mass.

10. An apparatus for forming metal hydroxide, comprising:
   a first container;
   a second container that is larger than said first container wherein said first container is located inside of said second container, wherein said first container is a porous container that is a plastic container with plastic sides that have holes that provide a porosity such that water molecules and ions can pass through said holes but insoluble particles can not pass through said holes and said insoluble particles will be retained within said first container;
   a hydroxyl-producing cathode located inside said second container outside of said first container;
   hydroxyl ions produced by said hydroxyl-producing cathode;
   an acid-producing anode located inside said first container;
   acid produced by said acid-producing anode;
   a direct current electricity source connected to said hydroxyl-producing cathode and said acid-producing anode;
   direct current electricity produced by said direct current electricity source in a direct current electricity path between said hydroxyl-producing cathode and said acid-producing anode;
   a metal silicate mass located inside said first container, wherein said metal silicate mass is a metal silicate mass that has been ground, powdered, fractured, or drilled and wherein said acid-producing anode is placed in contact with said metal silicate mass;
   metal silicate contained in said metal silicate mass that is contacted by said acid produced by said acid-producing anode, or by said hydroxyl ions produced by said hydroxyl-producing cathode, or by both said acid produced by said acid-producing anode and by said hydroxyl ions produced by said hydroxyl-producing cathode, wherein said metal silicate constitutes pieces or particles composed partly or entirely of metal silicate;
   a water solution located inside said first container and said second container, said water solution having an ion concentration, wherein said ion concentration is sufficient to allow said direct current electricity to pass in said direct current electricity path between said acid-producing anode and said hydroxyl-producing cathode; and
   wherein said first container that is a porous container and is a plastic container with plastic sides that have holes is positioned inside of said second container with said plastic sides entirely within said second container, wherein said plastic sides are immersed in said water solution located inside said first container and said second container, said first container is a porous container containing said water solution and containing said acid-producing anode, said metal silicate mass, and said metal silicate, wherein said hydroxyl-producing cathode is located in said second container outside of said first container that is a porous container;
   wherein said acid-producing anode and said hydroxyl-producing cathode are at least partially submerged in said water solution;
   wherein said direct current electricity is applied across said acid-producing anode and said hydroxyl-producing cathode, said direct current electricity being of sufficient current and voltage to generate said hydroxyl ions at said hydroxyl-producing cathode and generate said acid at said acid-producing anode, said acid or said hydroxyl ions being of sufficient concentration to convert at least some of said metal silicate into metal ions and silicate ions;
   wherein said silicate ions react with said acid produced by said acid-producing anode and form silica or silicic acid; and
   wherein said metal ions react with said hydroxyl ions produced by said hydroxyl-producing cathode to form the metal hydroxide.

11. The apparatus of claim 10 wherein said metal silicate mass is a metal silicate mass that is a naturally or artificially amassed metal silicate mass.

* * * * *